United States Patent
Li

(10) Patent No.: US 11,230,017 B2
(45) Date of Patent: Jan. 25, 2022

(54) ROBOTIC ANIMAL PUZZLE

(71) Applicant: Petoi LLC, Pittsburgh, PA (US)

(72) Inventor: Rongzhong Li, Pittsburgh, PA (US)

(*) Notice: Subject to any disclaimer, the term of this patent is extended or adjusted under 35 U.S.C. 154(b) by 0 days.

(21) Appl. No.: 16/654,104

(22) Filed: Oct. 16, 2019

(65) Prior Publication Data
US 2020/0122334 A1    Apr. 23, 2020

Related U.S. Application Data

(60) Provisional application No. 62/747,018, filed on Oct. 17, 2018.

(51) Int. Cl.
| | |
|---|---|
| B25J 11/00 | (2006.01) |
| A63H 11/20 | (2006.01) |
| A63H 3/46 | (2006.01) |
| B25J 9/08 | (2006.01) |

(52) U.S. Cl.
CPC ............ B25J 11/003 (2013.01); A63H 3/46 (2013.01); A63H 11/20 (2013.01); B25J 9/08 (2013.01); *A63H 2200/00* (2013.01)

(58) Field of Classification Search
CPC ... A63H 3/16; A63H 3/20; A63H 3/46; A63H 11/20; A63H 2200/00; B25J 9/08; B25J 11/003
USPC ....... 446/69, 90, 91, 97, 102, 317, 330, 352, 446/353, 356, 365, 376, 377, 379, 380
See application file for complete search history.

(56) References Cited

U.S. PATENT DOCUMENTS

| | | | |
|---|---|---|---|
| 5,052,680 A * | 10/1991 | Malewicki | A63H 33/003 472/137 |
| 6,337,552 B1 | 1/2002 | Inoue et al. | |
| 6,362,589 B1 * | 3/2002 | Inoue | G05D 1/0088 318/568.1 |
| 6,371,826 B1 * | 4/2002 | Pestonji | A63H 3/48 446/298 |
| 6,421,585 B1 * | 7/2002 | Takamura | G06N 3/008 700/245 |
| 6,445,978 B1 * | 9/2002 | Takamura | A63H 11/20 700/245 |
| 6,458,011 B1 | 10/2002 | Inoue et al. | |
| 6,481,512 B1 * | 11/2002 | Nagatsuka | A63H 11/20 180/8.1 |
| 6,484,068 B1 | 11/2002 | Yamamoto et al. | |
| 6,491,923 B1 | 12/2002 | Dave et al. | |

(Continued)

FOREIGN PATENT DOCUMENTS

| | | |
|---|---|---|
| CN | 104554510 B2 | 1/2017 |
| CN | 108773426 A1 | 11/2018 |

*Primary Examiner* — Joseph B Baldori
(74) *Attorney, Agent, or Firm* — Spilman Thomas & Battle, PLLC; William P. Smith

(57) ABSTRACT

A robotic animal puzzle is assembled from flat board pieces. The robotic animal includes a head portion. The head portion includes a neck group, a torso portion, including a holder 15 for an optional battery, multiple leg portions, and a tail portion. Those pieces and groups are connected using either interlocking mechanisms or flexible linkages to form the robotic animal-shaped puzzle. Movement and gestures may be controlled by an externally connected processor powered by an on-board battery pack. A pull and drag mechanism is provided to conveniently tune the center of mass. Slots allow the screw that connects the battery holder to slide.

20 Claims, 13 Drawing Sheets

(56) References Cited

U.S. PATENT DOCUMENTS

| | | | |
|---|---|---|---|
| 6,539,283 B2 * | 3/2003 | Takagi | A63H 30/04 318/568.1 |
| 6,667,593 B2 | 12/2003 | Inoue et al. | |
| 6,705,917 B2 * | 3/2004 | Filo | A63H 11/20 180/8.1 |
| 6,853,880 B2 | 2/2005 | Sakagami et al. | |
| 7,089,083 B2 | 8/2006 | Yokoo et al. | |
| 7,233,900 B2 | 6/2007 | Kariya | |
| 7,248,170 B2 | 7/2007 | Deome et al. | |
| 7,401,057 B2 | 7/2008 | Eder | |
| 7,442,107 B1 | 10/2008 | Ueda et al. | |
| 7,657,352 B2 | 2/2010 | Hattori et al. | |
| 7,695,341 B1 * | 4/2010 | Maddocks | A63H 13/02 446/330 |
| 7,769,487 B2 | 8/2010 | Ayers et al. | |
| 7,813,835 B2 | 10/2010 | Fujita et al. | |
| 7,887,713 B2 | 2/2011 | Hesse | |
| 7,901,265 B1 * | 3/2011 | Cameron | A63H 3/46 446/330 |
| 8,057,275 B2 * | 11/2011 | Cameron | A63H 13/02 446/330 |
| 8,083,565 B1 * | 12/2011 | Fulton | A63H 17/262 446/68 |
| 8,387,726 B2 | 3/2013 | Miyazaki | |
| 8,414,350 B2 * | 4/2013 | Rehkemper | A63H 11/20 446/330 |
| 8,713,025 B2 | 4/2014 | Eder | |
| 9,492,734 B2 | 11/2016 | Boulding | |
| 9,802,083 B2 * | 10/2017 | Martino | A63B 43/002 |
| 9,868,072 B2 | 1/2018 | Ghaly | |
| 2001/0029147 A1 * | 10/2001 | Hornsby | A63H 11/20 446/356 |
| 2002/0089297 A1 * | 7/2002 | Filo | B62D 57/022 318/568.12 |
| 2004/0210347 A1 * | 10/2004 | Sawada | G06N 3/008 700/246 |
| 2005/0079793 A1 * | 4/2005 | Ogihara | A63H 17/36 446/456 |
| 2007/0123142 A1 * | 5/2007 | Maddocks | A63H 13/02 446/377 |
| 2009/0047861 A1 * | 2/2009 | Van de Rostyne | A63H 27/12 446/37 |
| 2012/0022688 A1 | 1/2012 | Wong et al. | |
| 2016/0347387 A1 | 12/2016 | Hurst et al. | |
| 2019/0091592 A1 * | 3/2019 | Gillies | A63H 11/20 |
| 2020/0333800 A1 * | 10/2020 | Katayama | B25J 9/0003 |

* cited by examiner

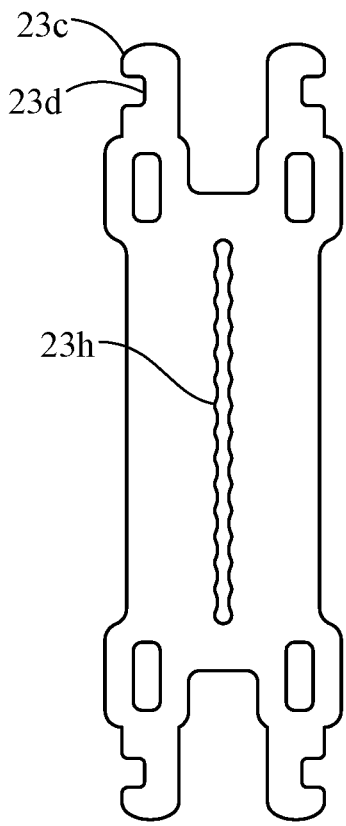
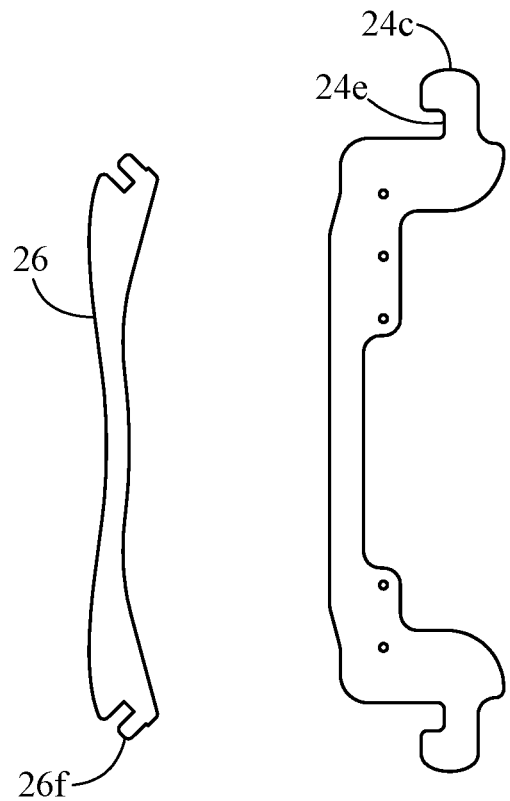
FIG. 2D
FIG. 2E
FIG. 2F
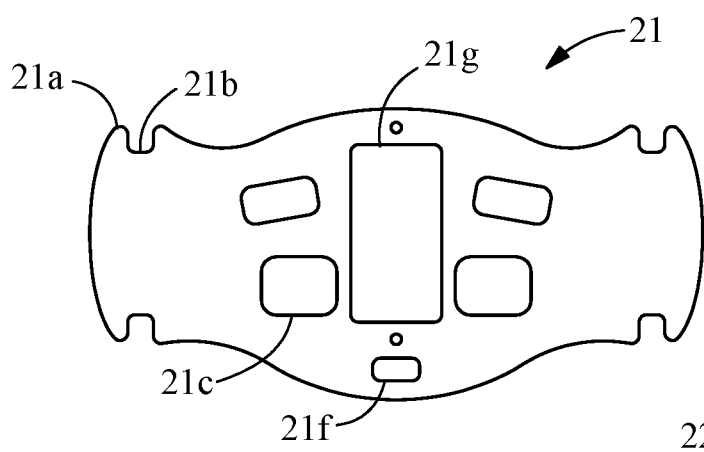
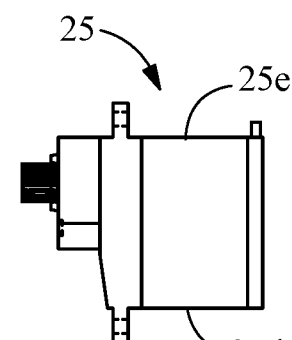
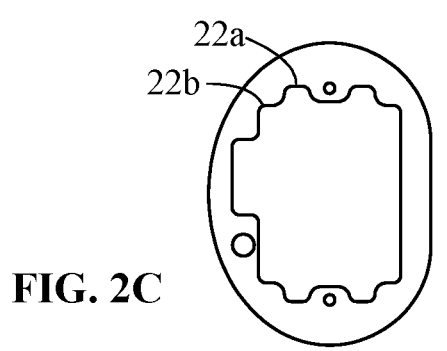
FIG. 2A
FIG. 2B
FIG. 2C

A8-A8

B8-B8

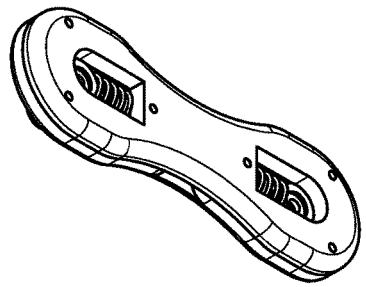 
FIG. 10D                                FIG. 10E
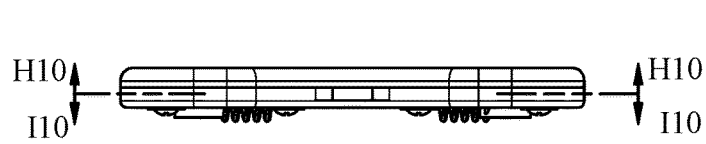 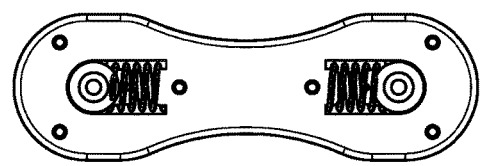
FIG. 10F                                FIG. 10G
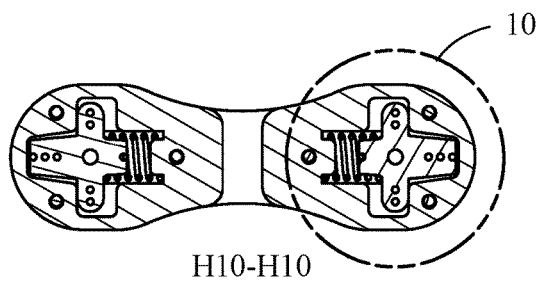 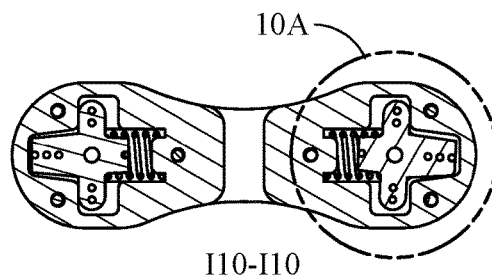
FIG. 10H                                FIG. 10I

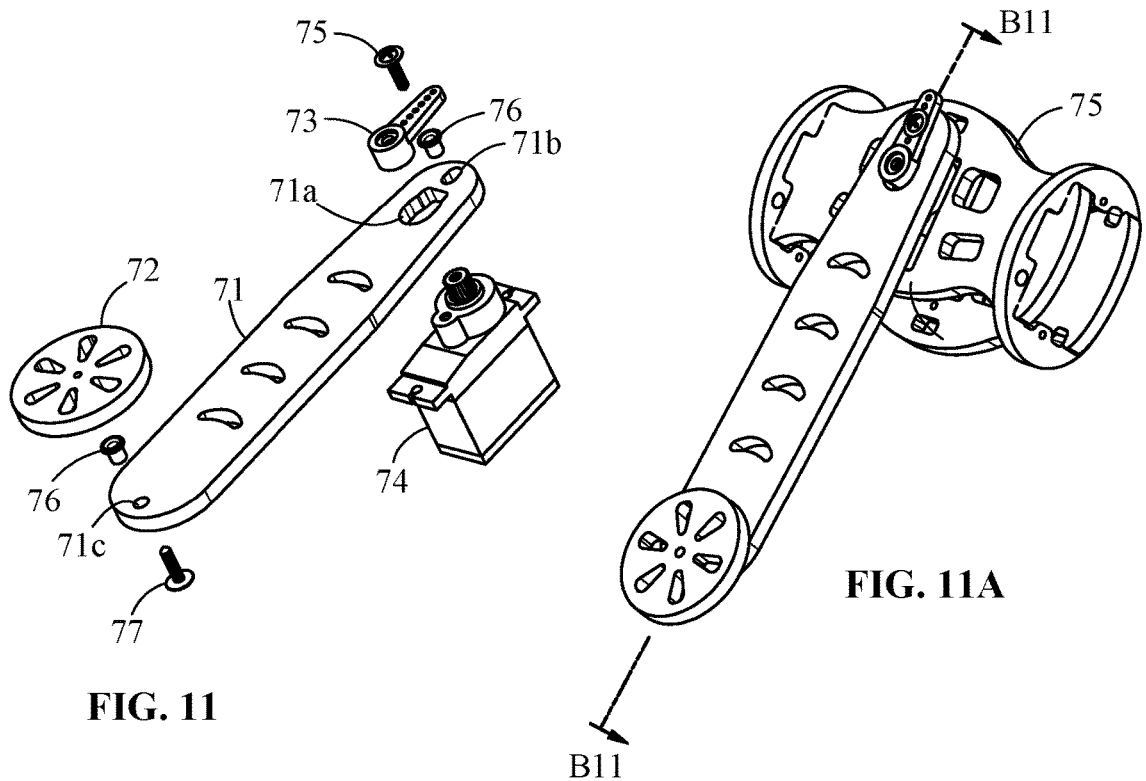
FIG. 11  FIG. 11A
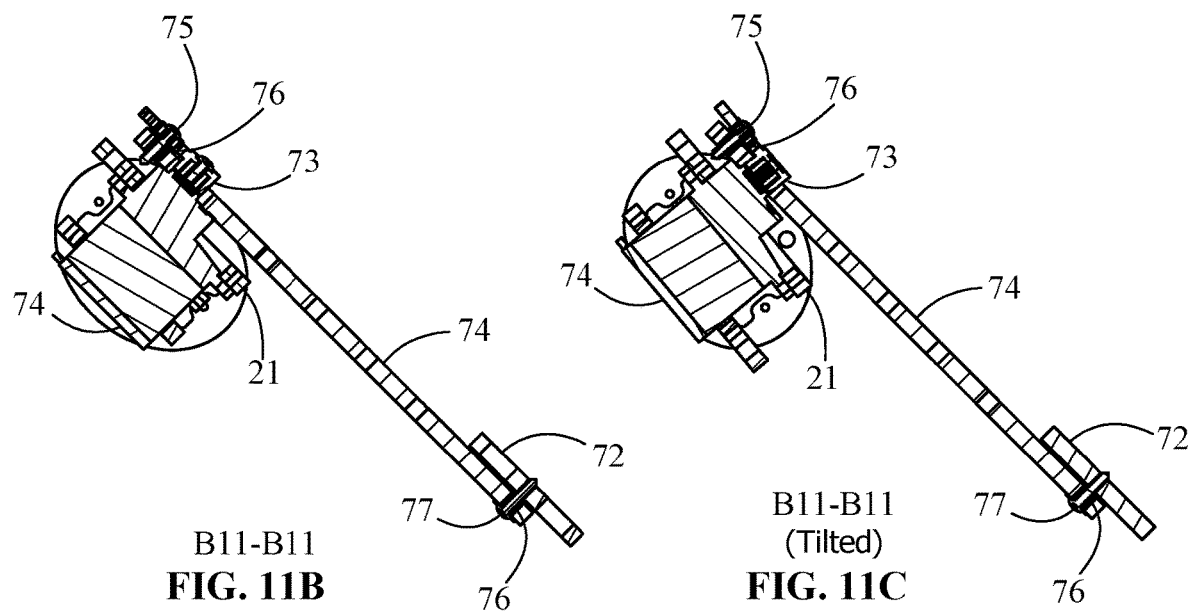
B11-B11
FIG. 11B
B11-B11
(Tilted)
FIG. 11C

ROBOTIC ANIMAL PUZZLE

CROSS-REFERENCE TO RELATED APPLICATIONS

This application claims priority to, and the benefit of U.S. Provisional Patent Application Ser. No. 62/747,018 filed Oct. 17, 2018, entitled "Robotic Animal Puzzle", which is hereby incorporated by reference.

BACKGROUND OF THE INVENTION

The application generally relates to a robotic animal puzzle. The application relates more specifically to a robotic animal puzzle with articulated appendages with controllable movements.

Robotic puzzles are used for entertainment and educational purposes, to teach mechanical skills and anatomy, and for enjoyment. The process of assembling modular components into a replica of an animal provides entertainment and is instructive in the assembly and interconnection of interactive parts. In addition, with the inclusion of microprocessor controls, the robotic puzzle may be assembled to be interactive and mobile, to simulate actual animal movements.

What is disclosed is a system and/or method that provides an animal shaped robot arranged in puzzle form that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs for interlocking mechanisms and flexible linkages for a robotic animal puzzle.

SUMMARY OF THE INVENTION

One embodiment is directed to a robotic animal device. The robotic animal device includes a head portion a torso portion, multiple leg portions, and a tail portion. The head portion includes a neck group operably coupled with the torso portion through a tilt group and a pan group. The tilt group includes a middle piece, a mouth piece, an eye piece, a chin piece, an ultrasound sensor, an ear piece, and a first servo motor operable to tilt the head portion. The pan group includes opposing neck pieces, a small servo arm, a base piece, a pair of small lock portions, and a long servo arm; and a second servo motor connected between the torso group and the neck group at a shoulder portion of the torso portion. The torso portion includes a top piece and a bottom piece, at least one feature for tuning a center of mass of the robotic animal, an optional controller mounted on the top piece to coordinate the sensors and actuators of the animal device, a battery holder configured to receive one or more batteries. The battery holder is movably attached to the bottom piece by adjustment of the position with respect to the plurality of features, for tuning the center of mass of the robotic animal device. The multiple leg portions are movably attached to the torso portion to support and to control movement of the animal device.

An advantage of the invention is an easy to assemble robotic animal puzzle for entertainment and amusement.

Another advantage is the ability to tune the center of mass for balancing the movement of the robotic animal device.

Still another advantage is a thigh design having shock absorption springs to reduce wear.

Yet another advantage is a plurality of sensors installed on the movable head to simulate eyes, scan surroundings for perception and communicate signals to a controller.

A further advantage is a tail to help posturing and balancing.

Further advantages are described below and will be readily appreciated by persons skilled in the art.

BRIEF DESCRIPTION OF THE DRAWINGS

FIG. 2A shows a corner shoulder piece.

FIG. 2B shows a servo.

FIG. 2C shows a shoulder piece.

FIG. 2D shows a bottom piece.

FIG. 2E shows a spine piece.

FIG. 2F shows a torso connecting piece.

3A-3E show the assembly order of the torso frame.

Figure 4:
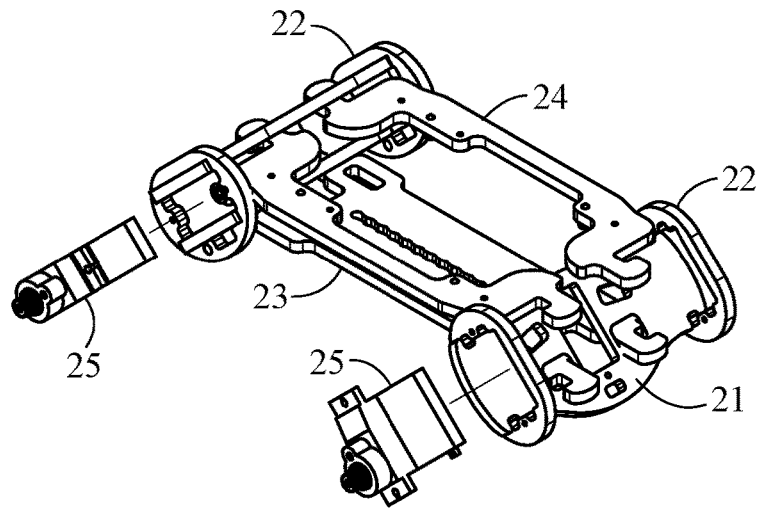

FIG. 4 shows the interlocking mechanisms in the torso frame.

Figure 4A:
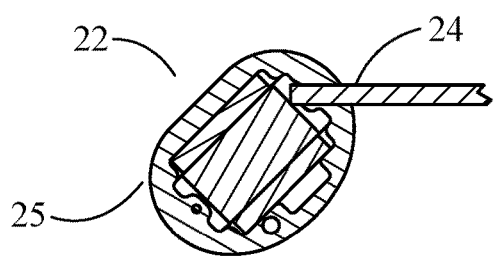
Figure 4B:
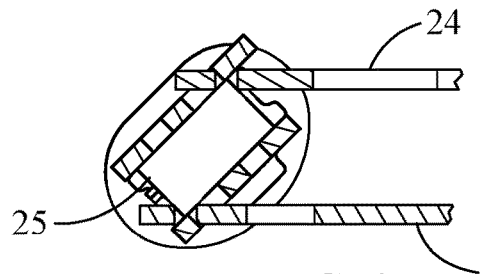
Figure 4C:
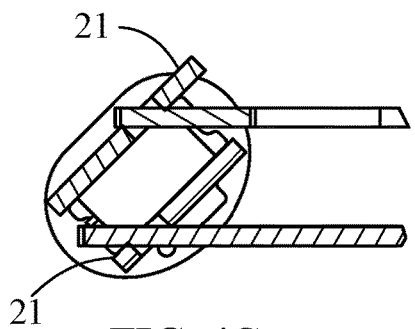
Figure 4D:
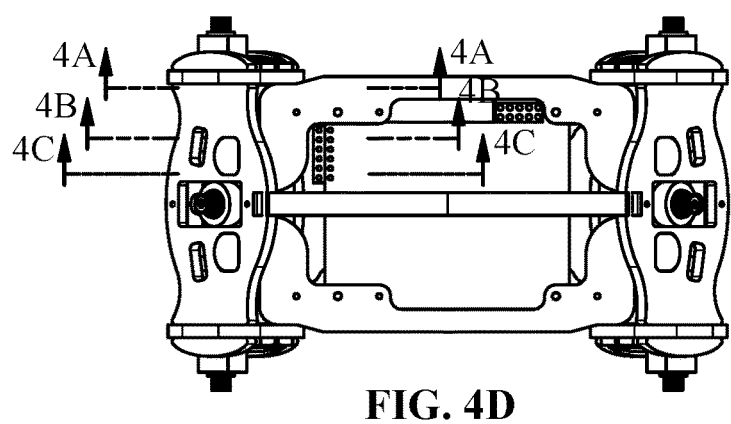

FIG. 4A shows a cross sectional view of the interlocking mechanisms in the torso frame, taken along the lines A4-A4 in FIG. 4D.

FIG. 4B shows a cross sectional view of the interlocking mechanisms in the torso frame taken along the lines B4-B4 in FIG. 4D.

FIG. 4C shows a cross sectional view of the interlocking mechanisms in the torso frame taken along the lines C4-C4 in FIG. 4D.

FIG. 4D shows a plan view of the interlocking mechanism.

Figure 5A:
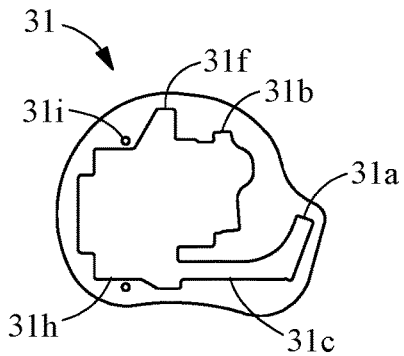

FIG. 5A shows a middle piece of the head group.

Figure 5B:
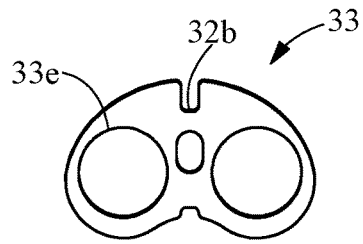

FIG. 5B shows an eye piece.

Figure 5C:
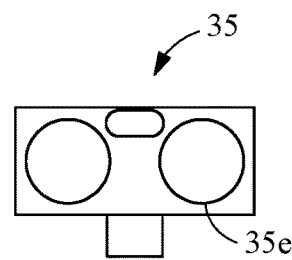

FIG. 5C shows an ultrasound piece.

Figure 5D:
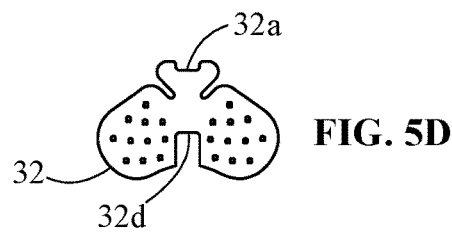

FIG. 5D shows a mouth piece.

Figure 5E:
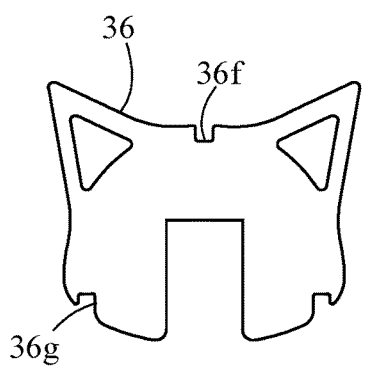

FIG. 5E shows an ear piece.

Figure 5F:
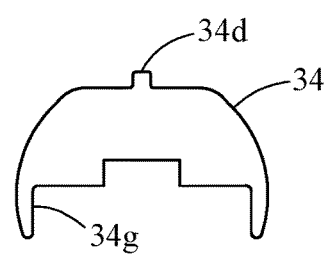

FIG. 5F shows a chin piece.

Figure 5G:
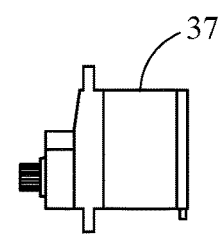

FIG. 5G shows a servo.

Figure 5H:
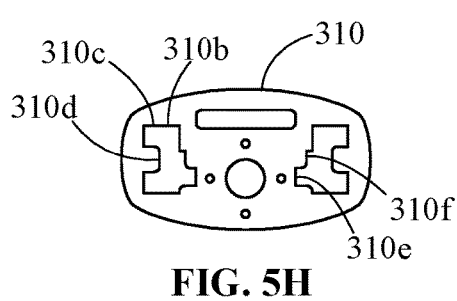

FIG. 5H shows a base piece.

Figure 5I:
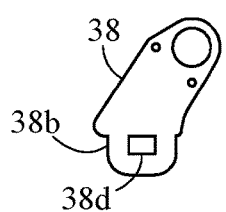

FIG. 5I shows a neck piece.

Figure 5J:
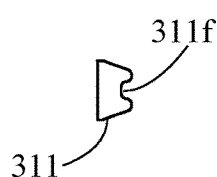

FIG. 5J shows a lock piece associated with the base piece.

Figure 5K:
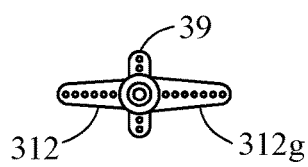
Figure 6A:
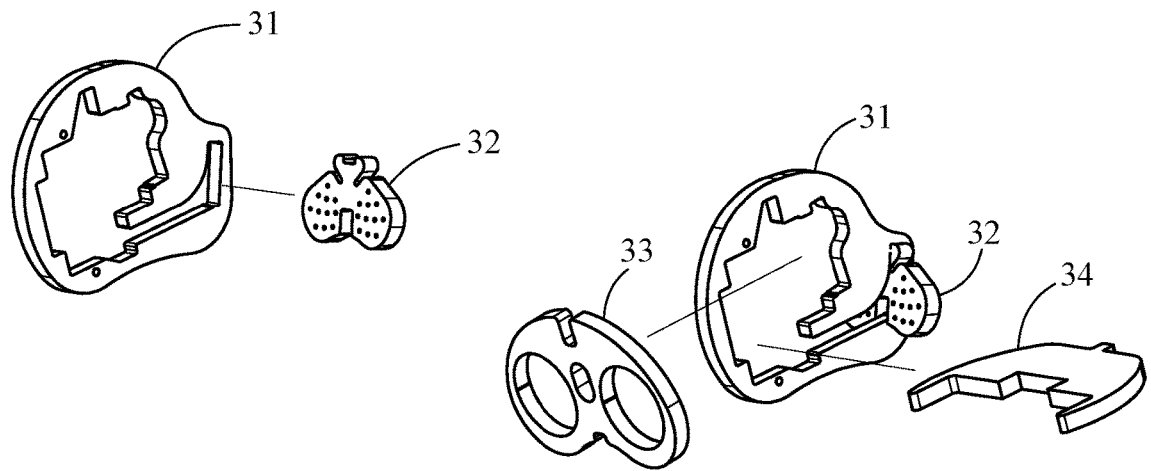
Figure 6B:
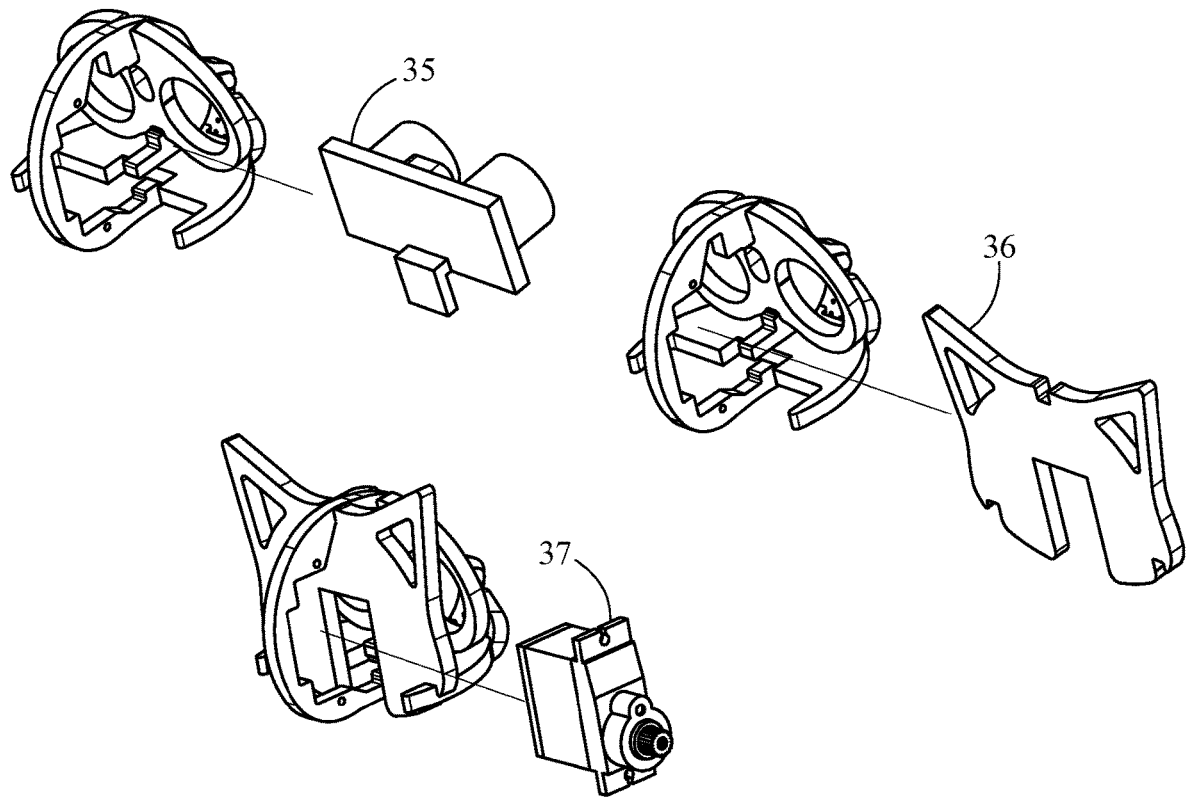
Figure 6C:
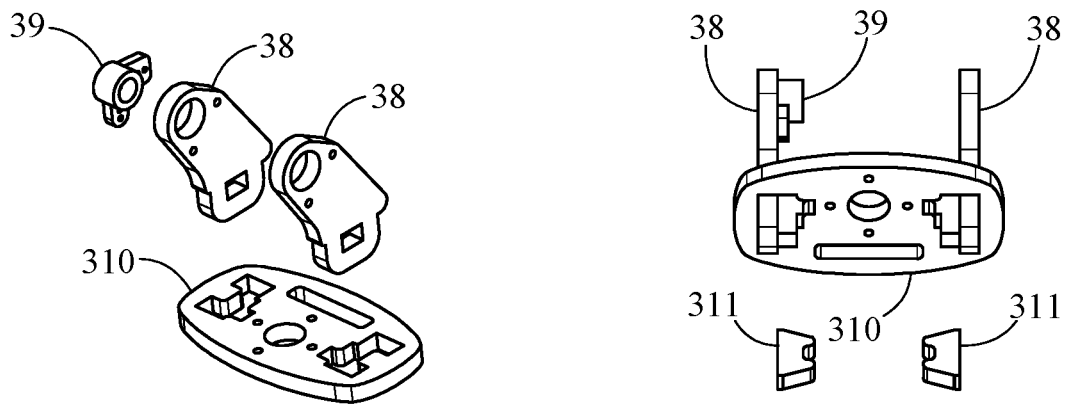
Figure 6C:
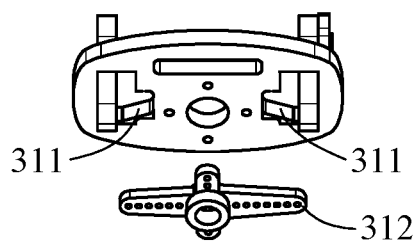
Figure 6D:
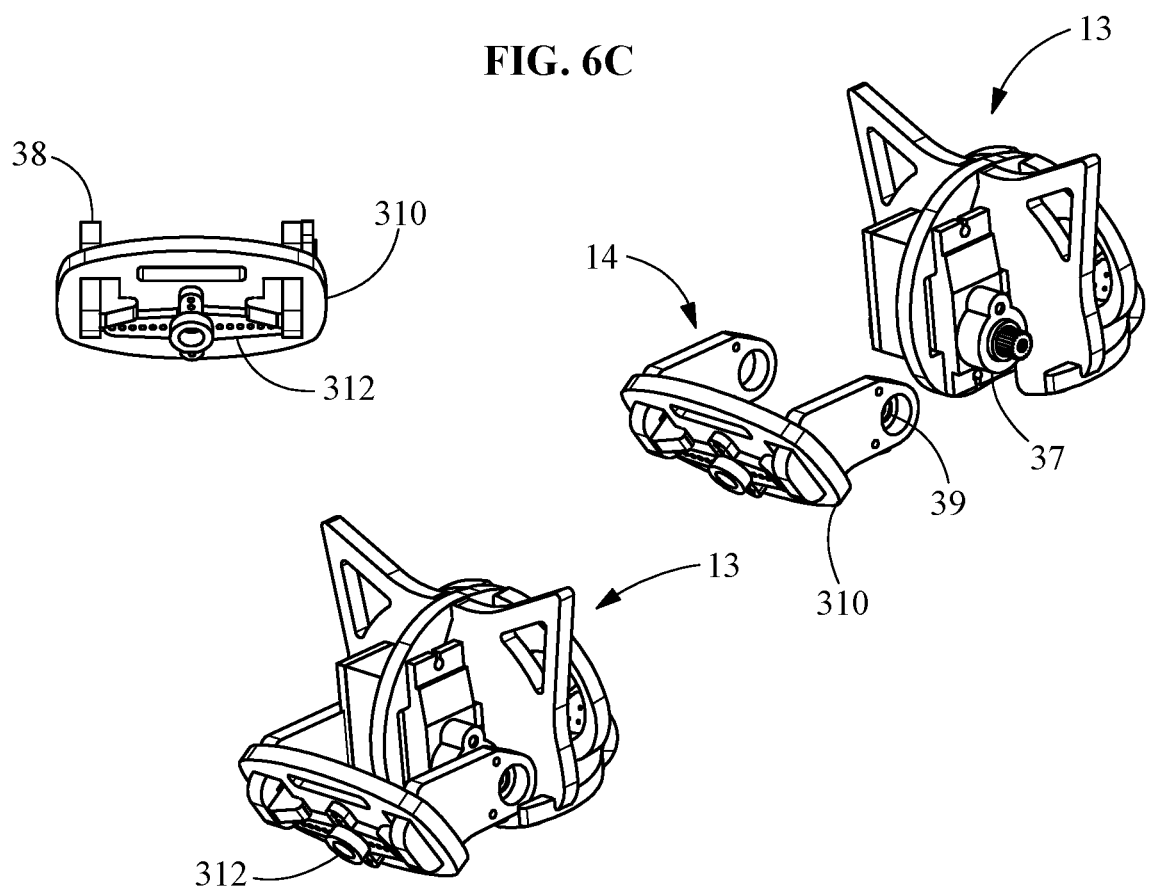

FIG. 5K shows a servo arm piece.

FIGS. 6A, 6B, 6C and 6D shows the interlocking mechanisms and the assembling order of the head group.

Figure 1:
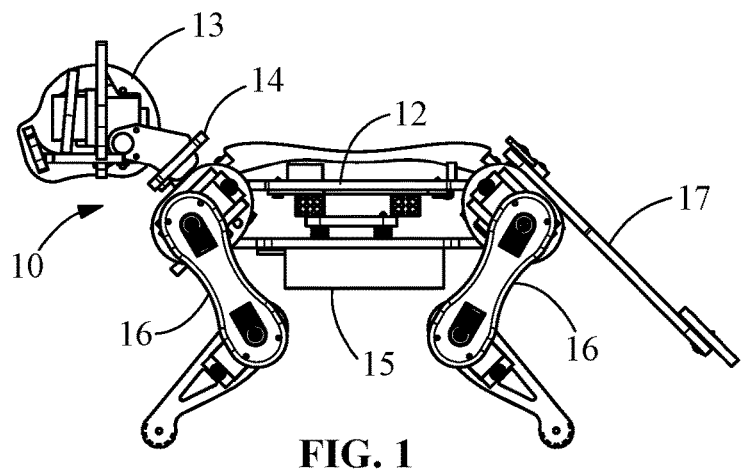
FIG. 1 shows an elevational view of an exemplary embodiment of an assembled robotic animal puzzle of the present invention.
Figure 1A:
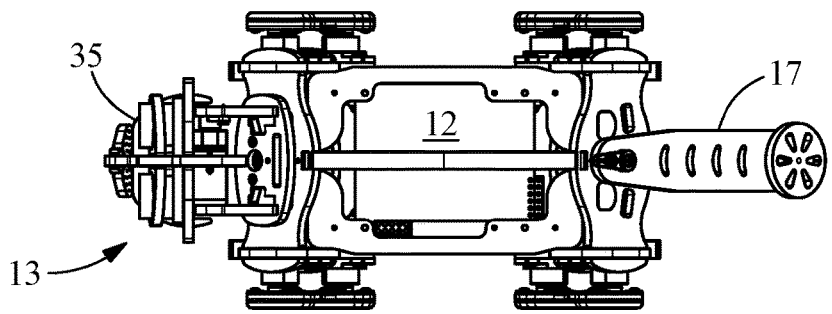
FIG. 1A shows a top plan view of the assembled robotic animal puzzle of FIG. 1
Figure 1B:
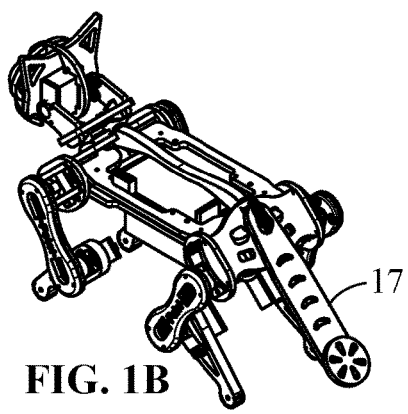
FIG. 1B shows a rear perspective view of the assembled robotic animal puzzle of FIG. 1
Figure 1C:
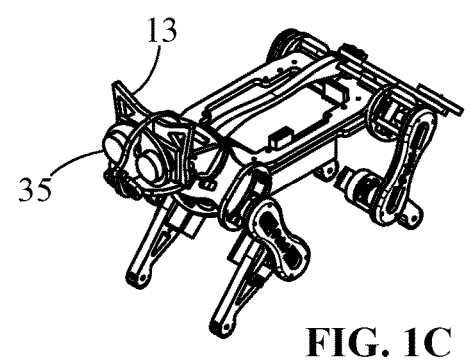
FIG. 1C shows a front perspective view of the assembled robotic animal puzzle of FIG. 1
Figure 1D:
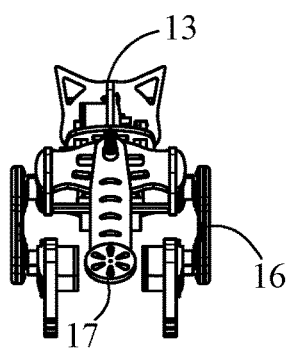
FIG. 1D shows a rear elevational view of the assembled robotic animal puzzle of FIG. 1
Figure 1E:
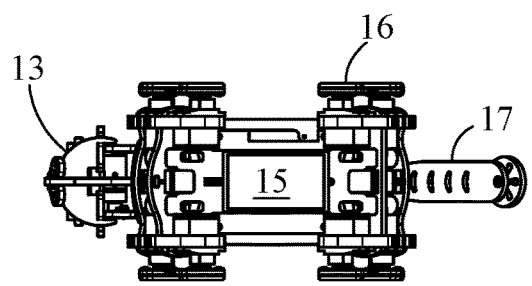
FIG. 1E shows a bottom plan view of the assembled robotic animal puzzle of FIG. 1.
Figure 1F:
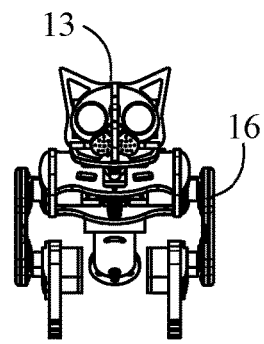
FIG. 1F shows a front elevational view of the assembled robotic animal puzzle of FIG. 1
Figure 7:
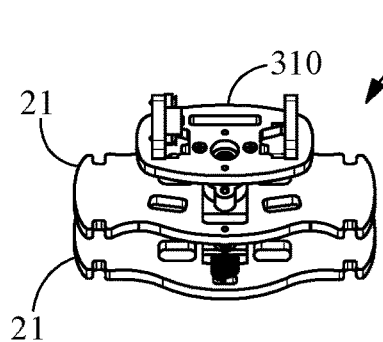

FIG. 7 shows the flexible linkage in the neck joint of the robot of FIG. 1.

Figure 7A:
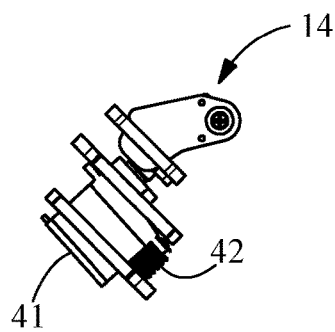

FIG. 7A shows the panning servo for the flexible linkage in the neck joint.

Figure 7B:
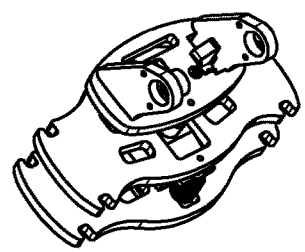

FIG. 7B shows the perspective view of the panning servo.

Figure 7C:
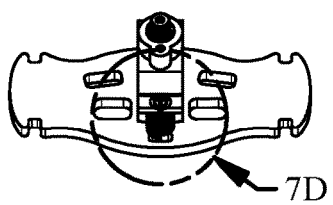

FIG. 7C shows another perspective view of the panning servo partially assembled.

Figure 7D:
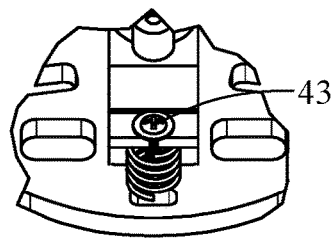

FIG. 7D shows the screw connection of the spring.

Figure 7E:
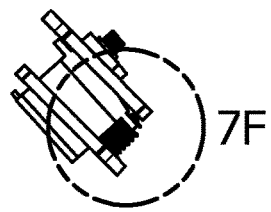

FIG. 7E shows a side view of the panning servo spring without a load.

Figure 7F:
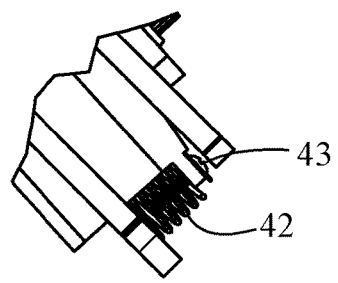

FIG. 7F shows the detail view of FIG. 7E.

Figure 7G:
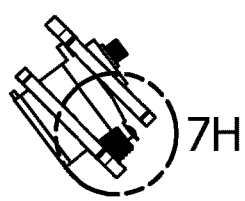

FIG. 7G shows the a side view of the panning servo spring compressed under a load.

Figure 7H:
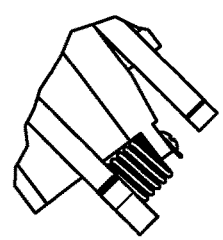

FIG. 7H shows the detail view of FIG. 7G.

Figure 8:
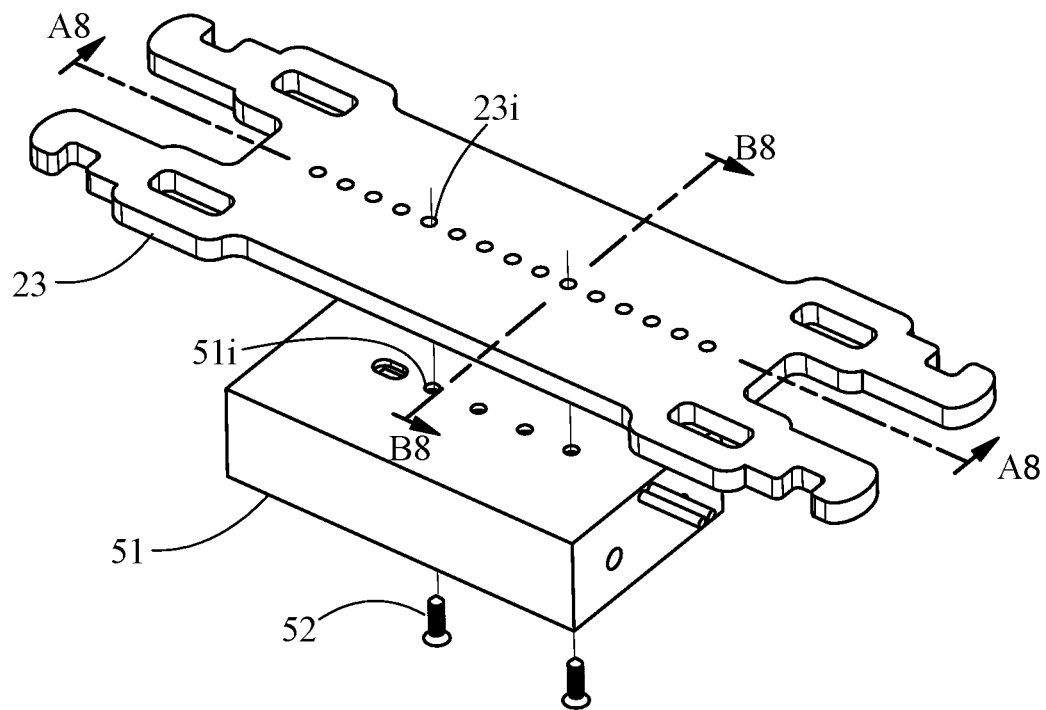

FIG. 8 shows an exploded view of an embodiment of the torso and the battery pack assembly showing the sequential screw holes for tuning the center of mass.

Figure 8A:
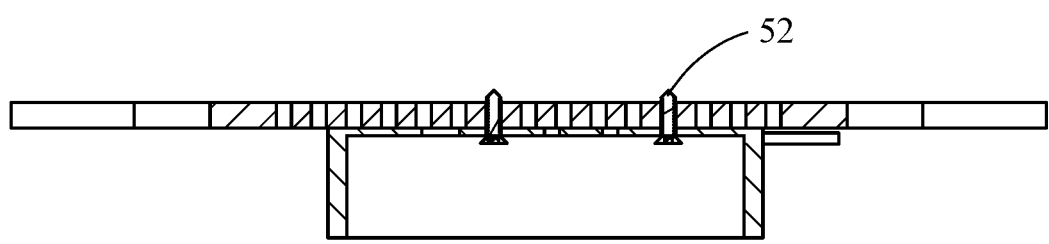
Figure 8A:
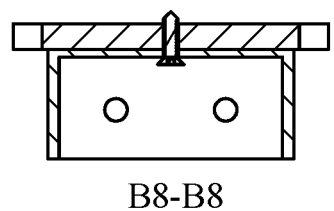

FIG. 8A shows a cross sectional view of the torso showing the screw attachment between the battery pack and the torso.

Figure 9:
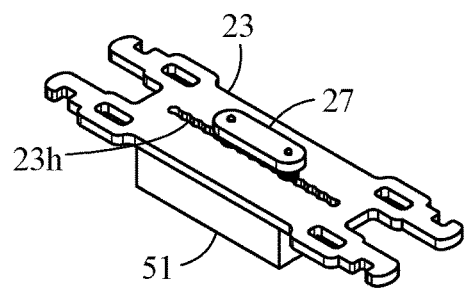

FIG. 9 shows the pull and drag mechanism for conveniently tuning the center of mass of the robot.

Figure 9A:
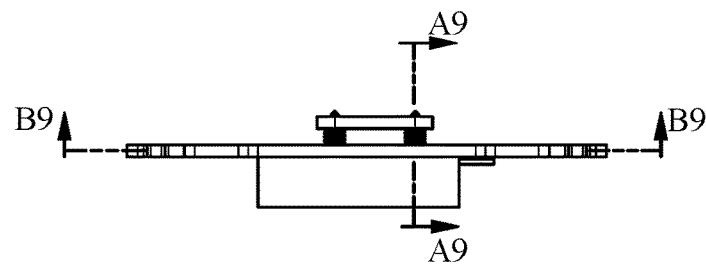

FIG. 9A shows a cross-sectional view of the pull and drag mechanism of FIG. 9

Figure 9B:
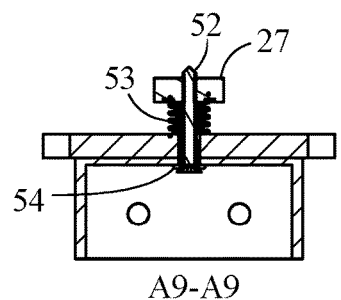

FIG. 9B shows a cross-sectional view taken along the lines A9-A9 in FIG. 9A.

Figure 9C:
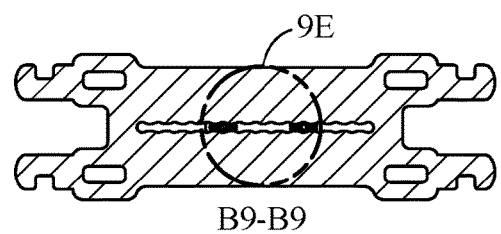

FIG. 9C shows a cross-sectional view taken along the lines B9-B9 in FIG. 9A.

Figure 9D:
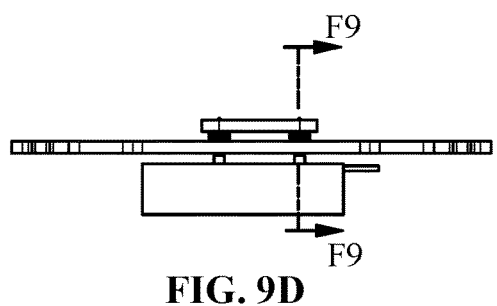

FIG. 9D shows a cross-sectional view of the pull and drag mechanism of FIG. 9 in an adjustment position having a compressed spring.

Figure 9E:
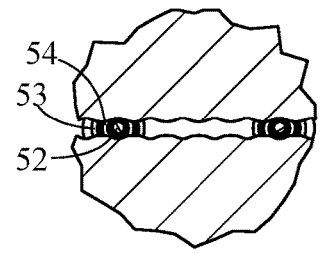

FIG. 9E shows the locked position for screw and rivet arranged as shown in FIG. 9B.

Figure 9F:
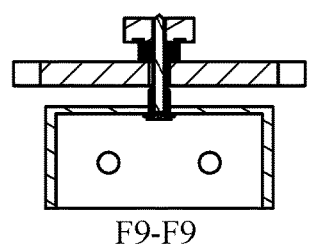

FIG. 9F shows a cross sectional view taken along lines F9-F9 in FIG. 9D.

Figure 9G:
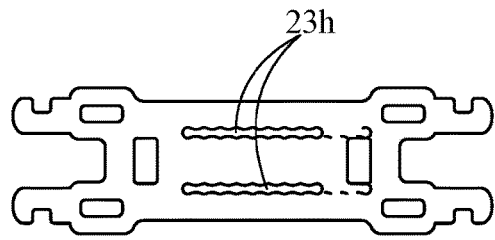

FIG. 9G shows an alternate configuration of the pull and drag mechanism having dual slots.

Figure 9H:
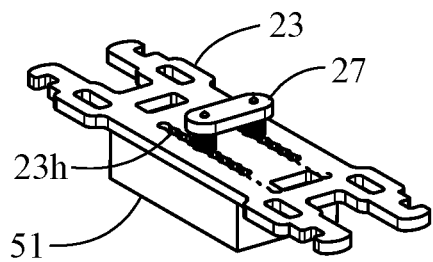

FIG. 9H shows a perspective view of the pull and drag mechanism having dual slots.

Figure 9I:
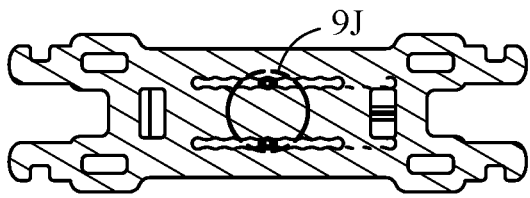

FIG. 9I shows another view of the screw and rivet arranged as shown in FIG. 9H.

Figure 9J:
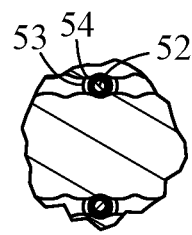

FIG. 9J shows the locked position for screw and rivet arranged as shown in FIG. 9I.

Figure 10:
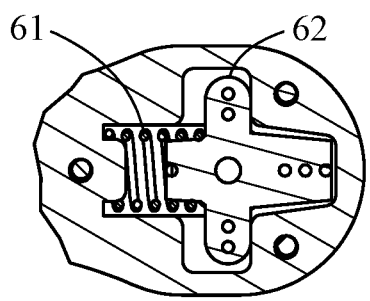

FIG. 10 shows the shock reduction mechanism in the thigh of the robot of FIG. 1.

Figure 10A:
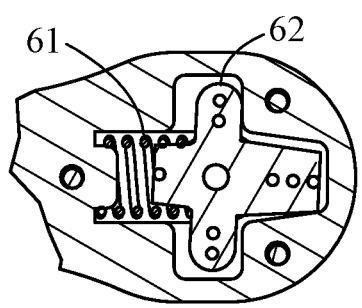

FIG. 10A shows the other face of the intersection of FIG. 10.

Figure 10B:
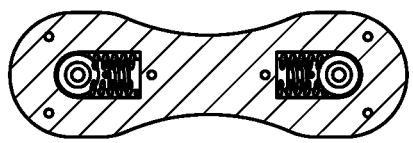

FIG. 10B shows the inside of the thigh top portion.

Figure 10C:
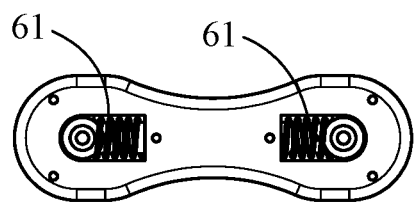

FIG. 10C shows the outside of the thigh top portion.

FIG. 10D shows a perspective view of the thigh top outside portion.

FIG. 10E shows an elevational end view of an assembled thigh portion.

FIG. 10F shows an assembled side view of the thigh top inside and outside portions.

FIG. 10G shows the bottom outside thigh portion.

FIG. 10H shows the bottom inside thigh portion.

FIG. 10I shows the bottom inside thigh portion in rotational position.

FIG. 11 shows an exploded view of a partially constrained tail joint and a wheel at the tail's end.

FIG. 11A shows an assembled tail joint.

FIG. 11B shows a tail joint in a regular position.

FIG. 11C shows a tail joint in a tilted position.

DETAILED DESCRIPTION OF THE INVENTION

Referring to FIGS. 1 and 1A through 1F, perspective views of the assembled robotic animal puzzle 10 are shown. The figure shows multiple projected views of a robotic animal puzzle 10 built with flat board pieces. Robotic animal puzzle 10 includes a head portion 13 including a neck group 14, a torso portion 12 including a holder 15 for an optional battery (not shown), multiple leg portions 16, and a tail portion 17. Those pieces and groups are connected using either interlocking mechanisms or flexible linkages as described in later figures.

The methods for driving the robotic animal puzzle 10 are described in U.S. Provisional Patent Application Ser. No. 62/614,479, filed Jan. 8, 2018, entitled "LEGGED ROBOTS AND METHODS FOR CONTROLLING LEGGED ROBOTS", which is hereby incorporated by reference.

Referring to FIGS. 2A through 2C, and FIG. 3 and FIGS. 3A through 3E, the torso frame portion is described. Torso portion 12 is made of four sets of identical pieces, and assembled symmetrically about axis 2A-2A and 2B-2B.

Figure 3:
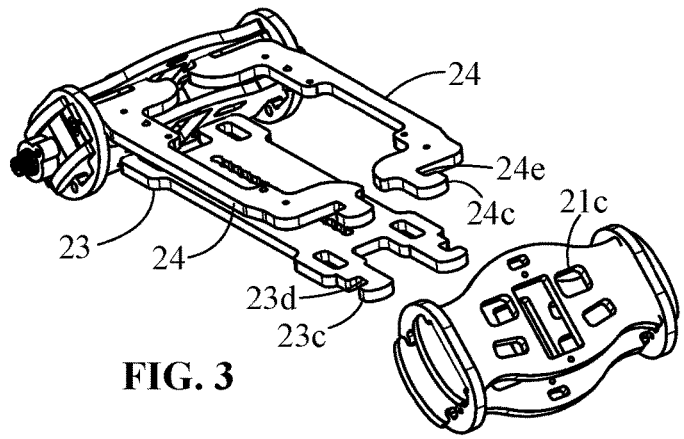
FIGS. 3 and FIGS. 3A-3E show the assembling order of the torso frame.
Figure 3A:
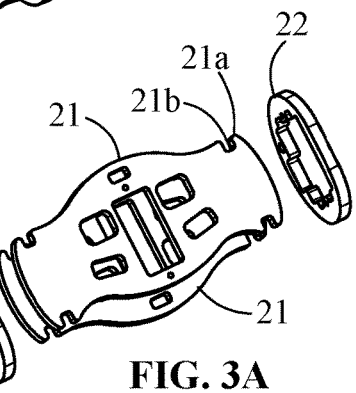
Figure 3C:
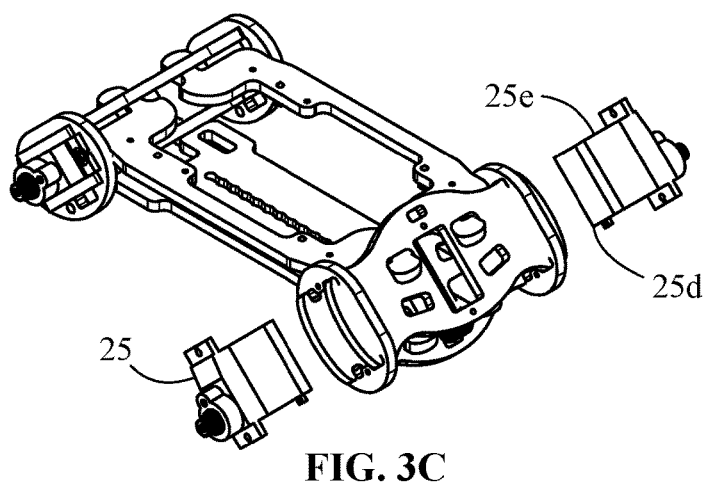
Figure 3B:
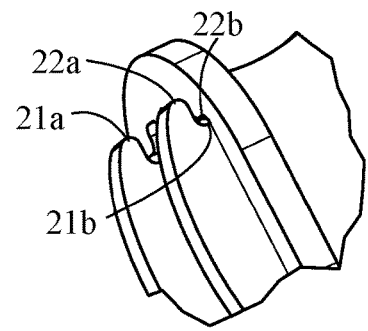
Figure 3D:
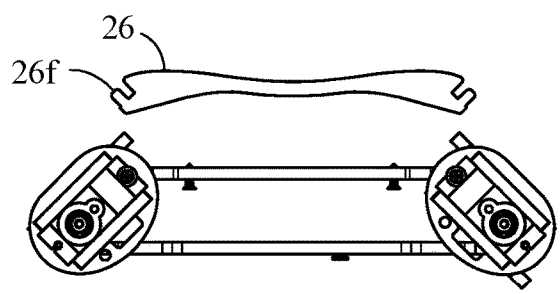
Figure 3E:
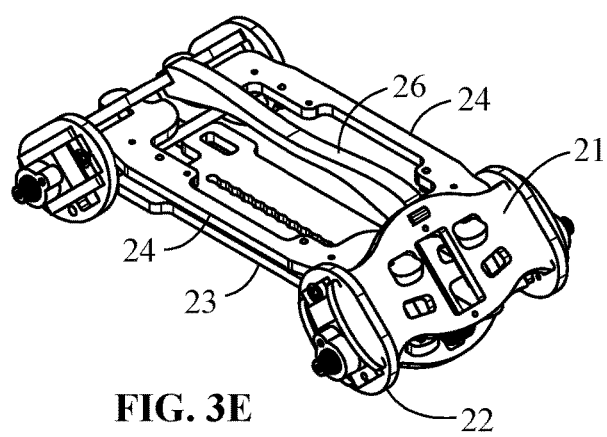

FIG. 3. Assembling order of the torso frame. In the embodiment of FIGS. 3A through 3E, the assembling starts from the front shoulder. Corner 21a on shoulder pieces are inserted to shoulder pieces 22 through their wider slots 22a. When the dent 21b on pieces 21 matches 22b on 22 (See FIGS. 2A to 2F and FIG. 3), push the two pieces 21 away from each other to fix their position in pieces 22 by friction. That makes one shoulder group. The shoulder group on the other side is assembled in the same way. Pieces 23 and 24 are inserted into slot 21c on the shoulder group. Then two servo pieces 25 are inserted into pieces 22, through the gap between pieces 21. They are further pushed into the dent 23d on 23, and dent 24e on 24. Finally two screws will fix servo 25 onto 22. The shoulder group on the other side is assembled in the same way. Finally an optional spine piece 26 is inserted into the slots 21f on shoulder group to further stabilize the torso frame.

Referring to FIG. 4, interlocking mechanisms in the torso frame. The torso interlocking mechanism involves three major locks. Section view A-A shows that piece 22 constrains 21 with friction between dent 21b and slot 22a. However the 21 pieces can still move towards each other if without servo 25.

Section view B3-B3 shows that servo 25 stops pieces 21 from moving towards each other. Pushing the corners 25d and 25e of 25 into the slots 23d and 24e will lock the shoulder groups at an angle of 45 degrees.

Section view C3-C3 shows that once pieces 23, 24 are inserted into the shoulder groups on both ends, the distance between piece 23 and piece 24 is constrained by slots 21c.

The above interlocks forms a quite stable trapezoid. The only part that may become loose due to wear is the 45 degree constrained by the corners 25d and 25e in slots 23d and 24e. An optional spine piece F helps to tighten the structure by fixing the distance between 21f on the two shoulder groups.

Referring to FIGS. 5A through 5K, parts of the head groups are shown. The head group has two sub groups, tilt group and pan group. The tilt group has a middle piece 31, a mouth piece 32, an eye piece 33, a chin piece 34, an ultrasound piece 35, an ear piece 36, and a servo 37. The pan group has two neck pieces 38, a small servo arm 39, a base piece 310, two small locks 311, and a long servo arm 312.

Referring to FIG. 6A through 6D, interlocking mechanisms and the assembling order of the head group are shown. In this figure, the assembling of tilt group starts from the middle piece 31. The mouth piece 32 and the eye piece 33 are slidable into the slots 31a and 31b of 31. The chin 34 is inserted into slot 31c on middle piece 31, and its tab 34d is pushed into 32d on 32 to lock the position of 32. Its upper surface pushes the lower edge of piece 33 to lock it in middle piece 31. The ultrasound sensor 35 is inserted into the eye piece 33 through 33e. The ear piece 36 is inserted in slot 31f. Its front surfaces pushes ultrasound 35 to lock it in 33. Its dent 36g matches 34g and locks piece 34 in slot 31c. The servo 37 is inserted into slot 31*h* on middle piece 31 to lock piece 36. Itself is fixed onto middle piece 31 by two screws at 31*i*.

The ultrasonic sensor is used for both morphological and functional uses. It resembles the eyes of a cat, and it measures the distance in front of the device and can transmit signal to the controller for perception. It can be replaced by other sensors that can fit into the space.

The assembling of pan group starts from screwing "L" shaped servo arm 39 onto one of the neck 38 at 38*a*. The two 38 are inserted into the wider slot 310*b* on the base 310 and are pushed apart into the narrower slots 310*c*. 310*d* is inserted into 38*d* at the same time. Two "C" shaped locks 311 are inserted to base 310 through the wider slots 310*e* then slides to the narrower slot 310*f* to lock the necks 38 and keep them perpendicular to the base. The long servo arm 312 is screwed onto base 310 and its longer ends 312*g* locks the small locks 311 in the narrower slot 310*f*. The pan and tilt groups are connected through the servo arm 39. The whole head group and the torso group are connected through the servo arm 312.

Referring to FIG. 7 and FIGS. 7A through 7H, the flexible linkage 100 in the neck joint is shown. The head portion is linked to the body through neck group 14. When the robotic animal puzzle 10 is moving, it's possible to have head-on collisions when excessive force will be applied to the head portion. A flexible linkage 100 is introduced between the neck and body to allow small shifts and damper the shock to protect the joint and components.

The panning servo 41 connects the shoulder and the neck group 14. It is inserted into slot 21*g* on the top shoulder piece 21 and can slide freely. A spring 42 stands on the bottom shoulder piece 21 and pushes the servo towards top piece 21. A screw 43 is attached to panning servo 41 and is inserted through the spring 42. It avoids the spring from jumping out. The edge on the other side of the servo serves as the pivot for rotation. When the head drops down during collision, the servo will be able to rotate along the pivot axis. The spring absorbs some of the shock and brings the servo back to normal position.

The means for tuning the CoM by adjusting the position of the battery holder 51 are shown in FIGS. 8 and 9. FIG. 8 shows the tuning means as a row of sequential screw holes 23*i* for receiving screws 52, FIG. 9 shows an alternate tuning means that includes a slot 23*h* for receiving a screw 54 into a slide assembly 27. Referring to FIGS. 8 and 8A, the sequential screw holes for tuning the center of mass are shown. Walking is a dynamic process where the center of mass (CoM) continuously moves in and out of the projected area of foot-ground contacts. It is vital for quadruped walking to control the leg movements (gaits) relate to the CoM. On the other hand, if the gaits are preset and fixed, it's possible to tune the location of CoM to optimize the walking performance. Because the battery pack contributes a large portion of the total body mass, changing its location will effectively tune the CoM.

In one possible configuration, there are one or more rows of sequential screw holes 23*i* on the bottom torso piece 23, lined along the longer/spinal direction of the torso. The screw holes are separated by certain distances that meets the minimal precision requirements for tuning the CoM. The battery holder 51 is attached to the bottom piece by screws 52 through screw holes 51*i*, while its location can be adjusted by screwing into proper screw holes among the hole matrix.

Referring to FIG. 9, in an alternate embodiment, a pull and drag mechanism for conveniently tuning the center of mass is shown. One or more long slots, or tracks, 23*h* on torso piece 23 are provided to allow the screw 52 that connects the battery holder 51 to slide along. The width of the slot is slightly larger than the outer diameter of the screw. For every screw, a through hole rivet 54 is inserted into the battery holder then the bottom torso piece 23. The rivet's inner diameter is slightly larger than that of the screw 52. Its outer diameter is larger than the width of the long slots 23*h*. The length of the rivet is close to the thickness of the torso piece 23. Along the slot 23*h*, there are sequential larger holes separated by certain distances that meets the minimal precision requirements for tuning the CoM. The diameter of the holes is slightly larger than the outer diameter of the rivet. The screws 52 will go through the rivet 54, the holes on the bottom of the battery holder 51, the long slot 23*h*, a compression spring 53, and eventually screws in to the nut piece 27 above the bottom torso piece 23.

The extension force by the spring 53 is slightly stronger than the weight of the battery holder with batteries. By pushing the nut piece 27 upward, it lifts the rivet 54 into the large holes along the slot 23*h*. Because the width of the slot is smaller than the outer diameter of the rivet, the rivet will lock the location of the battery pack that it attaches to.

By dragging the battery holder 51 downward, the spring can be compressed more to allow the battery holder to be pulled down. Its attached rivet 54 will be pulled out of the holes on the long slot 23*h*. Now only the thinner screw 52 is inside the slot and is free to move along the long direction of the slot. After tuning the location of the battery pack, just release it and the spring will extend and lift the rivet 54 into the nearest larger hole along the long slot 23*h*. The location of the battery pack is locked again.

FIG. 9G shows an alternate embodiment of bottom piece of the pull and drag mechanism having multiple slots 23*h* for tuning the center of mass.

Referring to FIG. 10 and FIGS. 10A through 10I, a shock reduction mechanism in the thigh is shown. Walking is a periodical motion and the involving joints can experience wear and damage during frequent loading and unloading force. Unexpected stops and collisions can further damage the mechanical parts in the actuator. An elastic linkage is introduced between the actuating servo motor and the limb.

Each upper leg, or thigh, includes a track to receive the motor arm 62 for each driving servo motor embedded in another body portion. The servo arm is partially constrained in the track and is pushed by a spring 61 to its regular position (shown in section view B10-B10). It can also move along the long direction of the thigh, or rotate about the joint axis.

The servo arm will experience external force or torque when the relative position between the thigh and the servo joint changes. If the force on the servo arm is larger than the compressing force of the spring, the servo arm will slide along the long direction of the thigh. If there's shearing force component, the contacting point between the servo arm and the track becomes the pivot for possible rotation. If the external torque is larger than the torque generated by the spring's tension, the servo arm will rotate and slide along the long direction at the same time (shown in section view D10-D10). The friction during the sliding also absorbs some of the energy to dampen oscillation.

The elastic linkage turns fast changing loads into gradually changed tension in the spring and dampers sudden shocks. It also creates a tolerated torsion range to avoid damage on the servo during collision, or hurt people touching the limbs.

In the disclosed embodiment, the thigh may be divided into top and bottom pieces, which may provide some convenience for manufacturing and assembling.

Referring to FIGS. 11, 11A and 11B, a partially constrained tail joint and a wheel at the tail's end are shown. A tail is important for animals' balancing, posturing and appearance. The robot has a tail portion 71 attached to the torso through a partially constrained joint. A servo arm 73 inserts through slot 71a and connects to a panning servo 74. A screw 75 is fixed on the servo arm and goes through a metal rivet 76 then inserts into the slot 71b. The slot is longer than the diameter of rivet to allow the tail to rotate by a small angle in pitch direction. The length of the rivet is slightly larger than the thickness of the slot to prevent it falling out. The metal rivet 76 is used to reduce friction between the screw 75 and the slot 71b.

In some situation, the end of the tail will be contacting ground or other surfaces and scratch. An optional wheel piece 72 is installed at the end of the tail to reduce friction. A screw 77 goes through hole 71c on the tail piece 71 through a metal rivet 76. The inner diameter of rivet is slightly larger than the diameter of screw, and the outer diameter of rivet is slightly smaller than the diameter of hole 71c. The length of the rivet is slightly larger than the thickness of tail 71. The rounded end of the rivet sits between the wheel and the tail as a washer spacer.

The tail piece 71 can be actively driven by the servo in pan direction, and can also be passively driven by gravity depending on body orientation, or by the centrifugal force caused by the fast spinning rotation. The tail piece 71 is used for balancing during walking or standing. It can rotate to the falling side to avoid rolling, pushing the body for rolling recovering, and can be the third supporting point for standing up with two hind legs.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the robotic animal puzzle as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application may include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A robotic animal device comprising:
   a head portion, a torso portion, multiple leg portions, and a tail portion;
   the head portion comprising a neck group operably coupled with the torso portion through a tilt group and a pan group;
   the tilt group comprising a middle piece, a mouth piece, an eye piece, a chin piece, at least one ultrasound sensor, an ear piece, and a tilt servo motor operable to tilt the head portion;
   the pan group comprising a pair of opposing neck pieces, each of the neck pieces interlocked with a base piece, the base piece attached to a small servo arm, a pair of small lock portions, and a long servo arm; and a panning servo motor connected between the first base piece and a shoulder portion, the shoulder portion connected to the torso portion; and
   the torso portion comprising a top torso piece and a bottom torso piece, a battery holder configured to receive one or more batteries, the battery holder movably attached to the bottom torso piece for adjustment of a position along the bottom torso piece, at least one means for tuning a center of mass by adjustment of the position of the battery holder along the bottom torso piece; and the multiple leg portions movably attached to the bottom torso piece to support and to control movement of the robotic animal device.

2. The device of claim 1, wherein the at least one means for tuning the center of mass comprise one or more rows of apertures separated by predetermined distances for receiving screws; and wherein the battery holder is slidably attachable to the bottom torso piece and adjustable by selectively attaching to the bottom torso piece.

3. The device of claim 1, wherein the at least one ultrasound sensor being inserted into the eye piece, and configured to communicate with a controller for responding to sensed objects.

4. The device of claim 1, wherein the ear piece is inserted in a slot of the middle piece, the ear piece arranged to urge the at least one ultrasound sensor into fixed engagement with the eye piece.

5. The device of claim 4, wherein a plurality of sensors are inserted into the eye piece, the ear piece is inserted into the middle piece, wherein the ear piece pushes the sensors to lock it in the eye piece; and the tilt servo motor is inserted into the middle piece.

6. The device of claim 1, wherein the tilt servo motor is disposed in a slot on the middle piece to lock the ear piece onto the middle piece.

7. The device of claim 6, wherein the pan group further comprising a small servo arm attached to the neck group; and the pair of small lock portions inserted into the base piece to lock each of the opposing neck pieces and maintain each of the opposing neck pieces perpendicular to the base piece; the long servo arm fastened to the base piece; the pan group connected with the tilt group through the small servo arm in engagement with the tilt servo motor; and wherein the head group and the torso group being connected through the long servo arm in engagement with the panning servo motor.

8. The device of claim 1, wherein the tilt group comprises the mouth piece and the eye piece slidable into the middle piece; the chin piece interlocking with the middle piece.

9. The device of claim 1, wherein a flexible linkage is disposed between the neck group and the shoulder portion, the flexible linkage configured to damper a shock; and wherein the panning servo motor connects the shoulder portion with the neck group, a spring attached on the shoulder portion to urge the panning servo motor towards the first base piece.

10. The device of claim 1, wherein the means for tuning comprise one or more rows of screw holes disposed on the bottom torso piece, coaxial with the torso portion; the screw holes separated by distances for tuning the center of mass; and wherein the battery holder is attached to the bottom torso piece so that a position of the battery holder is adjustable by selectively positioning the battery holder along the one or more rows of screw holes.

11. The device of claim 1, wherein the means for tuning comprises one or more slots to receive a screw that connects the battery holder to the bottom torso piece to allow the battery holder to slide; the width of the one or more slots being slightly larger than the outer diameter of the screw; the one or more slots further comprising a plurality of holes larger in diameter than the inner diameter of the one or more slots and separated by a certain distance for tuning the center of mass.

12. The device of claim 11, wherein the device further comprises a compression spring, and a nut piece disposed above the bottom torso piece; an extension force of the compression spring being greater that the weight of the battery holder and the one or more batteries; wherein in response to pushing the nut piece upward a rivet lifts into the respective hole to secure the battery holder into a desired position; and wherein dragging the battery holder downward allows the battery holder to be pulled down and the rivet pulled out of the holes on the slot to move the battery holder along the respective slot.

13. The device of claim 1, wherein each leg portion comprising a track for receiving a motor arm for a driving servo motor, each driving servo motor being embedded in the torso portion; the motor arm being partially constrained in the track and pushed by a spring to a regular position; the motor arm under a force when the relative position between the leg portion and the motor arm changes; wherein in response to the force on the servo arm the servo arm slides in the track; and wherein in response to an external torque the motor arm rotates and slides along the leg portion.

14. The device of claim 1, wherein the tail portion is attached to the torso portion through a partially constrained joint; the tail portion comprising a tail servo arm connected to a tail panning servo; the tail portion rotatable in a pitch direction.

15. The device of claim 14, wherein the tail further comprising a wheel piece attached at an end of the tail to reduce friction.

16. The device of claim 14, wherein the tail being drivable by the tail panning servo in a pan direction, and rotatable sideways to push against the torso portion for balancing the device.

17. A robotic animal device comprising:
a head portion, a torso portion, multiple leg portions, and a tail portion;
the head portion comprising a neck group operably coupled with the torso portion through a tilt group and a pan group;
the tilt group comprising a middle piece, a mouth piece, an eye piece, a chin piece, at least one ultrasound sensor, an ear piece, and a tilt servo motor operable to tilt the head portion;
the pan group comprising a pair of opposing neck pieces, each of the neck pieces interlocked with a base piece, the base piece attached to a small servo arm, a pair of small lock portions, and a long servo arm; and a panning servo motor connected between the base piece and a shoulder portion connected to the torso portion; and
the torso portion comprising a top torso piece and a bottom torso piece, a battery holder configured to receive one or more batteries, the battery holder movably attached to the bottom torso piece for adjustment of a battery position along the bottom torso piece, at least one means for tuning a center of mass by adjustment of the position of the battery holder along the bottom torso piece; and the multiple leg portions movably attached to the bottom torso piece to support and to control movement of the robotic animal device;
wherein the tilt group comprises the mouth piece and the eye piece slidable into the middle piece; the chin piece interlocking with the middle piece in a locked position; and an upper surface of the chin piece configured to urge a lower edge of the chin piece to lock the chin piece in the middle piece.

18. The device of claim 17, wherein the means for tuning comprises one or more slots to receive a screw that connects the battery holder to the bottom torso piece to allow the battery holder to slide; the width of the one or more slots being slightly larger than the outer diameter of the screw; the one or more slots further comprising a plurality of holes larger in diameter than the inner diameter of the one or more slots and separated by certain distances for tuning the center of mass.

19. The device of claim 17, further comprising a compression spring, and a nut piece disposed above the bottom torso piece; an extension force of the compression spring being greater that the weight of the battery holder and the one or more batteries; wherein, in response to pushing the nut piece upward, a rivet lifts into a respective hole of the plurality of holes to secure the battery holder into a desired position; and wherein dragging the battery holder downward allows the battery holder to be pulled down and the rivet pulled out of the holes to move the battery holder along a longitudinal direction of the respective slot.

20. A robotic animal device comprising:
- a head portion, a torso portion, multiple leg portions, and a tail portion;
- the head portion comprising a neck group operably coupled with the torso portion through a tilt group and a pan group;
- the tilt group comprising a middle piece, a mouth piece, an eye piece, a chin piece, at least one ultrasound sensor, an ear piece, and a tilt servo motor operable to tilt the head portion;
- the pan group comprising a pair of opposing neck pieces, each of the neck pieces interlocked with a base piece, the base piece attached by a small servo arm, a pair of small lock portions, and a long servo arm; and a panning servo motor connected between the base piece and a shoulder portion connected to the torso portion; and
- the torso portion comprising a top torso piece and a bottom torso piece, at least one means for tuning a center of mass, a battery holder configured to receive one or more batteries, the battery holder movably attached to the bottom torso piece; and the multiple leg portions movably attached to the bottom torso piece to support and to control movement of the robotic animal device;
- wherein the means for tuning a center of mass comprise one or more rows of screw holes disposed on the bottom torso piece, coaxial with the torso portion; the screw holes separated by distances for tuning the center of mass; and wherein the battery holder is attached to the bottom torso piece so that a position of the battery holder is adjustable by selectively positioning along the one or more rows of screw holes.

* * * * *